(12) United States Patent
Forry et al.

(10) Patent No.: US 6,733,015 B2
(45) Date of Patent: May 11, 2004

(54) GASKETS WITH CONTROLLED FLANGE SURFACE ADHESION PROPERTIES

(75) Inventors: John S. Forry, Lancaster, PA (US); Brian C. Lehr, Pequea, PA (US)

(73) Assignee: Interface Solutions, Inc., Lancaster, PA (US)

( * ) Notice: Subject to any disclaimer, the term of this patent is extended or adjusted under 35 U.S.C. 154(b) by 0 days.

(21) Appl. No.: 09/799,315

(22) Filed: Mar. 5, 2001

(65) Prior Publication Data

US 2001/0033059 A1 Oct. 25, 2001

Related U.S. Application Data

(60) Provisional application No. 60/186,985, filed on Mar. 6, 2000.

(51) Int. Cl.$^7$ .............................. F02F 11/00; F16J 15/08
(52) U.S. Cl. ...................... 277/590; 277/592; 277/627; 277/652
(58) Field of Search ................................ 277/591, 592, 277/593, 596, 602, 608, 609, 626, 627, 628, 630, 650, 652, 654, 910, 922, 923

(56) References Cited

U.S. PATENT DOCUMENTS

| | | | |
|---|---|---|---|
| 1,772,173 A | 8/1930 | Yates | |
| 2,070,918 A | 2/1937 | Peterson et al. | 288/1 |
| 2,289,620 A | 7/1942 | Bernstein | 288/28 |
| 2,681,241 A | 6/1954 | Aukers | 288/21 |
| 3,353,666 A | 11/1967 | Jensen | 206/65 |
| 3,355,181 A | 11/1967 | Olson | 277/180 |
| 3,655,210 A | 4/1972 | Farnam et al. | 277/235 |

(List continued on next page.)

FOREIGN PATENT DOCUMENTS

| | | | | |
|---|---|---|---|---|
| DE | 28 31 217 A | 1/1980 | ............ | F16J/15/12 |
| DE | 8520709 | 10/1985 | ............ | F16J/15/10 |
| DE | 3433376 A 1 | 3/1986 | ............ | F16J/15/10 |
| DE | 86 24 855.3 | 12/1987 | ............ | F16J/15/12 |
| DE | 37 11 664 A1 | 10/1988 | ............ | F16J/15/12 |
| DE | 37 19 189 A1 | 12/1988 | ............ | F16J/15/12 |
| DE | 39 03 918 A1 | 8/1990 | ............ | F16J/15/12 |
| DE | 41 16 822 A1 | 11/1992 | ............ | F16J/15/10 |
| DE | 4211076 A 1 | 10/1993 | ............ | F16J/15/10 |
| DE | 44 17 840 A1 | 11/1995 | ............ | F16J/15/08 |
| EP | 0 041 906 | 12/1981 | ............ | F16J/15/10 |
| EP | 0041906 A 1 | 12/1981 | ............ | F16J/15/12 |
| EP | 0177709 A 1 | 4/1986 | ............ | F16B/43/00 |
| EP | 0179995 A 1 | 7/1986 | ............ | F16J/15/10 |
| EP | 0 202 909 | 11/1986 | ............ | F16J/15/10 |
| EP | 0 487 369 A1 | 5/1992 | ............ | F16J/15/12 |
| EP | 0 499 551 A1 | 8/1992 | ............ | F16J/15/08 |
| EP | 0790428 A1 | 8/1997 | ............ | F16J/15/12 |
| EP | 0899 488 A 1 | 3/1999 | ............ | F16J/15/12 |
| EP | 0 899 489 A 1 | 3/1999 | ............ | F16J/15/10 |
| GB | 1087616 | 10/1967 | | |
| GB | 1 357 586 | 6/1974 | ............ | B32B/7/12 |
| GB | 2 019 507 A | 10/1979 | ............ | F16J/15/06 |
| GB | 2019507 A | 10/1979 | ............ | F16J/15/06 |
| GB | 2 091 824 A | 8/1982 | ............ | F16J/15/06 |
| GB | 2 163 496 A | 2/1986 | ............ | F16J/15/12 |
| GB | 2328725 A | 6/1998 | ............ | F16J/15/10 |
| GB | 2 328 724 A | 3/1999 | ............ | F16J/15/10 |
| GB | 2 330 182 A | 4/1999 | ............ | F16J/15/12 |
| JP | 01093343 A | * 4/1989 | ............ | B32B/07/02 |
| WO | WO 89/11608 | 11/1989 | ............ | F16J/15/10 |

OTHER PUBLICATIONS

Translation of EP Patent (UK) Pub. of Translation May 31, 1989.

*Primary Examiner*—Anthony Knight
*Assistant Examiner*—Vishal Patel
(74) *Attorney, Agent, or Firm*—Womble Carlyle Sandridge & Rice, PLLC

(57) ABSTRACT

An improved gasket (11) for sealing the joint between a pair of flange surfaces is provided. In one embodiment, the gasket (11) is an edge coated gasket and the edge coating (14) also exhibits surface adhesion to enhance the seal provided by the gasket. In another embodiment, compressible sealing members (34, 44) are coated with a coating material (37, 47) that exhibits surface adhesion properties.

5 Claims, 2 Drawing Sheets

U.S. PATENT DOCUMENTS

| | | | | |
|---|---|---|---|---|
| 3,661,401 A | | 5/1972 | Farnam | 277/227 |
| 3,729,205 A | | 4/1973 | Kwok | 277/229 |
| 3,760,337 A | * | 9/1973 | Johnson | 439/265 |
| 3,785,856 A | | 1/1974 | Gotoh | 117/75 |
| 3,837,657 A | | 9/1974 | Farnam et al. | 277/1 |
| 3,869,393 A | * | 3/1975 | Booker | 508/167 |
| 3,890,183 A | | 6/1975 | Farnam | 156/193 |
| 3,970,322 A | | 7/1976 | Stecher et al. | 277/235 |
| 4,103,913 A | | 8/1978 | McDowell | 277/235 |
| 4,115,609 A | * | 9/1978 | Denman | 428/68 |
| 4,272,085 A | | 6/1981 | Fujikawa et al. | 277/235 |
| 4,431,197 A | | 2/1984 | Kirkwood | 277/1 |
| 4,434,989 A | | 3/1984 | Beyer et al. | 277/235 |
| 4,499,135 A | | 2/1985 | Mitchell et al. | 428/137 |
| 4,548,165 A | | 10/1985 | Vorobiev et al. | 123/41.84 |
| 4,600,201 A | | 7/1986 | Lönne et al. | 277/1 |
| 4,601,476 A | | 7/1986 | Usher et al. | 277/230 |
| 4,629,919 A | * | 12/1986 | Merkle | 310/90 |
| 4,635,949 A | | 1/1987 | Lucas et al. | 277/235 |
| 4,691,928 A | | 9/1987 | Abele | 277/235 |
| 4,741,965 A | | 5/1988 | Zerfass et al. | 428/447 |
| 4,743,421 A | | 5/1988 | McDowell et al. | 264/129 |
| 4,746,130 A | | 5/1988 | Abele | 277/228 |
| 4,795,166 A | | 1/1989 | Irmler | 277/1 |
| 4,834,279 A | * | 5/1989 | McDowell et al. | 277/592 |
| 4,932,673 A | | 6/1990 | Domnikov et al. | 277/235 |
| 4,956,525 A | * | 9/1990 | Wilk | 174/152 R |
| 5,033,756 A | | 7/1991 | Sixsmith et al. | 277/188 |
| 5,082,297 A | | 1/1992 | Flasher | 277/230 |
| 5,112,664 A | | 5/1992 | Waterland, III | 428/76 |
| 5,145,190 A | | 9/1992 | Boardman | 277/166 |
| 5,150,910 A | | 9/1992 | Udagawa | 277/235 |
| 5,180,631 A | | 1/1993 | Amano | 428/236 |
| 5,194,696 A | | 3/1993 | Read | 174/65 |
| 5,240,766 A | | 8/1993 | Foster | 428/280 |
| 5,286,574 A | | 2/1994 | Foster | 428/457 |
| 5,333,367 A | * | 8/1994 | Ashbrook | 29/275 |
| 5,437,767 A | | 8/1995 | Halout et al. | 162/145 |
| 5,518,257 A | * | 5/1996 | Breaker | 277/612 |
| 5,536,565 A | | 7/1996 | Halout et al. | 428/283 |
| 5,540,566 A | | 7/1996 | Ishizaki et al. | 417/297 |
| 5,551,706 A | * | 9/1996 | Barna et al. | 277/312 |
| 5,564,715 A | * | 10/1996 | Wallace | 277/612 |
| 5,607,763 A | * | 3/1997 | Matsuda | 428/323 |
| 5,615,898 A | * | 4/1997 | Clark et al. | 277/596 |
| 5,667,227 A | | 9/1997 | Boldt | 277/227 |
| 5,700,017 A | | 12/1997 | Tensor | 277/235 |
| 5,725,876 A | * | 3/1998 | Mantelle et al. | 424/449 |
| 5,902,956 A | * | 5/1999 | Spies et al. | 174/35 GC |
| 5,938,208 A | * | 8/1999 | Yoshida et al. | 277/592 |
| 6,029,811 A | * | 2/2000 | Heiligers | |
| 6,093,467 A | | 7/2000 | Forry | 428/66.4 |
| 6,247,703 B1 | * | 6/2001 | Forry et al. | 277/592 |
| 6,273,882 B1 | * | 8/2001 | Whittier et al. | 606/1 |
| 6,286,839 B1 | * | 9/2001 | Mitsui et al. | 277/603 |
| 6,422,575 B1 | * | 7/2002 | Czaplicki et al. | 277/628 |

* cited by examiner

GASKETS WITH CONTROLLED FLANGE SURFACE ADHESION PROPERTIES

REFERENCE TO RELATED APPLICATION

This application claims the benefit of the filing date of prior filed and co-pending U.S. provisional patent application serial No. 60/186,985 filed on Mar. 6, 2000.

BACKGROUND

1. Field of the Invention

This invention relates generally to gaskets and more particularly to improved gaskets for use in gasoline and diesel engines, compressors, oil coolers, and other machinery.

2. Description of the Related Art

Gaskets have long been used to seal interfaces between components in a wide variety of machines and especially in gasoline and diesel engines. Many types and forms of gaskets have been adopted including compressible fibrous gaskets, controlled compression rubber gaskets, metal gaskets, layered or composite gaskets, cork gaskets, rubber gaskets, and others. A detailed description of the background of some of these types of gaskets and of much of the art related to the present invention is included in our pending U.S. Utility Patent Application entitled "Edge Coated Gaskets and Method of Making Same." For purposes of brevity in this specification, including the claims, is hereby incorporated by reference as if fully set forth herein.

As discussed in detail in the attached application, providing a polymer coating on the interior edge of a compressible base sheet of gasket material results in an edge coated gasket with significantly enhanced sealability. When the edge coating on such gaskets is formed with protruding rims or with face coatings, the gasket can provide excellent sealability even under adverse conditions where traditional gaskets tend to fail. These conditions include rough or damaged flange surfaces, warped flanges, thin flanges that tend to deflect when clamped together, and poor bolt placement that can result in regions of substantially reduced compression stress. Further, the combination of an appropriately profiled polymer edge coating on a compressible base sheet results in a complex sealing mechanism that provides excellent sealability while simultaneously preserving the desirable property of compression failure resistance inherent in compressible gasket sheet materials.

As further discussed in the incorporated disclosure, edge coated compressible gaskets also address successfully the problem of stress relaxation failure, which is the failure mode most common in controlled compression rubber gaskets. Stress relaxation failure occurs when the rubber or polymer beads of controlled compression rubber gaskets relax over time due, for example, to rearrangement of polymer molecule chains in response to the stress state, shrinkage of the bead as a result of molecular chain crosslinking, softening and swelling of the bead due to fluid penetration, a degradation of the polymer molecule chains due to heat, fluid, and oxygen exposure. Since the flange gap is limited by a rigid carrier or compression limiters in controlled compression gaskets, the above enumerated conditions result in a reduction of the surface stress between the rubber beads and the flange surfaces. When the surface stress falls below the threshold required to prevent interfacial leakage, the seal is lost. An edge coating on a compressible base sheet is much less subject to stress relaxation failure because the base sheet itself relaxes a bit over time, progressively reducing the flange gap. This offsets any stress relaxation in the edge coating material and the integrity of the seal is maintained.

It has been found that the tackiness or surface adhesion inherent in many types of polymer edge coating materials enhances the sealability and further reduces the detrimental effects of stress relaxation in edge coated gaskets. Even in cases where stress between the edge coating and a flange surface may fall below the sealing threshold for whatever reason, the adhesion of the edge coating material to the flange surface maintains the seal and prevents failure of the gasket.

Unfortunately, the rubber materials from which the beads of controlled compression rubber gaskets are formed are substantially dry and exhibit very little surface adhesion. Thus, these types of gaskets have not benefited from the added reliability provided by the surface adhesion phenomenon. Further, in the case of some, but not all, polymer edge coatings, it is very difficult to tailor the polymer material to have the proper spring rate and other physical properties required by a particular application and also to exhibit a desired surface adhesion for the application. To some extent, these can be competing properties in that measures taken to enhance one tend to degrade the other and vice versa.

Thus, there exists a need for edge coated gaskets in which a predetermined surface adhesion between the coating material and the flange surfaces can be established to enhance sealability. A further need exists for a controlled compression rubber gasket wherein the rubber bead of the gasket can benefit from the advantages of surface adhesion. An efficient and reliable method of fabricating such gaskets is also needed. It is to the provision of such gaskets and such a method that the present invention is primarily directed.

SUMMARY OF THE INVENTION

Briefly described, the present invention, in preferred embodiments thereof, comprises edge coated and controlled compression rubber gaskets in which the edge coatings and rubber beads are provided with predetermined and specifically tailored surface adhesion properties appropriate to particular application requirements. In one and perhaps the simplest embodiment, the polymer material from which an edge coating is formed on and edge of a compressible base sheet is formulated to exhibit both the appropriate physical characteristics and the appropriate surface adhesion properties required for a specific application. In situations where both of these properties cannot be established simultaneously in a single polymer or homogeneous polymer blend, the invention contemplates an edge coating wherein a core of polymer material with the appropriate physical properties is covered or overcoated with a layer of polymer having the proper surface adhesion characteristics. In this instance, a layered or stratified edge coating is formed.

To provide traditional controlled compression rubber gaskets with the advantages of surface adhesion, the invention contemplates coating the rubber beads of such gaskets with a relatively thin layer of polymer or other appropriate material having the desired surface adhesion properties. In this way, if the bead suffers catastrophic stress relaxation failure, a seal can nevertheless be maintained by the surface adhesion provided by the coating. The method of this invention in one embodiment includes selecting a polymer edge coating material having predetermined physical and surface adhesion properties and forming an edge coating from the selected material on an edge of a gasket base sheet. The method also includes selecting a first edge coating material with predetermined physical properties, selecting a second edge coating material with predetermined surface adhesion properties, forming an edge coating on a gasket base sheet from the first coating material, and depositing a layer of the second edge coating material on the edge coating. The result is a layered edge coated gasket with tailored physical properties and tailored surface adhesion. Finally, the method of the invention also contemplates depositing a layer of material having selected surface adhesion properties onto the rubber bead or beads of a controlled compression rubber or other rubber edged gasket to provide the advantageous benefits of surface adhesion to such gaskets.

Thus, enhanced edge coated, controlled compression rubber, and rubber edged gaskets are now provided that address the problems of prior art gaskets and that provide enhanced seals through adhesion to flange surfaces between which they are clamped.

Accordingly, in one aspect, the invention relates to a gasket for creating a seal between a pair of surfaces, where the gasket comprises a base sheet having an adhesive element as an edge coating on at least one edge, the adhesive element being adapted to bond with the surfaces to enhance the seal provided by the gasket.

In another aspect, the invention relates to a gasket for creating a seal between a pair of surfaces, where the gasket comprises a non-compressible carrier as a base sheet having at least one edge forming a boundary of a gasket aperture and having at least one face comprising a recess; and at least one adhesive element as a bead structure disposed in the recess, the adhesive element being adapted to bond with the surfaces to enhance the seal provided by the gasket.

In yet another aspect, the invention relates to a gasket for creating a seal between a pair of flange surfaces, where the gasket comprises a non-compressible core having an interior edge; a coating of material which is at least partially compressible; and an adhesive element applied on at least one face of the gasket in an area adjacent to the interior edge of the non-compressible core.

In still another aspect, the invention relates to a gasket for creating a seal between a pair of flange surfaces, where the gasket comprises an o-ring having an adhesive element These and other features, objects, and advantages of the inventions disclosed herein will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
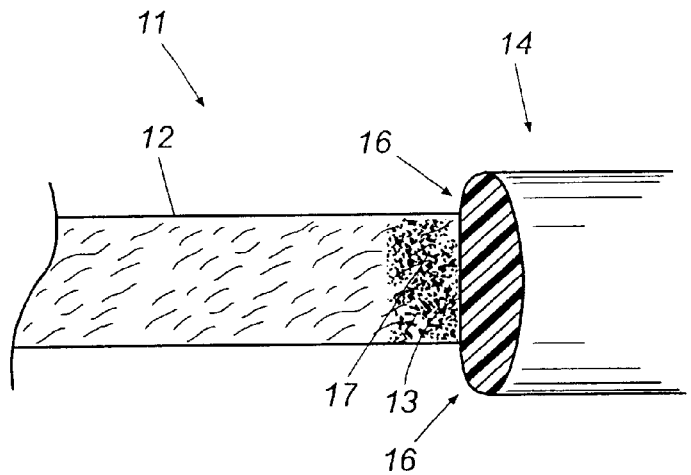
FIG. 1 is a cross-sectional illustration of an edge-coated gasket that embodies principles of the present invention in a preferred form.

Referring now in more detail to the drawings, wherein like reference numerals refer where appropriate to like parts throughout the several views, FIG. 1 illustrates a standard edge coated gasket that embodies principles of the invention. The gasket 11 comprises a compressible base sheet 12, which may be any suitably compressible gasket material but that preferably is fibrous and porous. The base sheet 12 has in interior edge 13 that defines and bounds an interior aperture of the gasket. An edge coating of polymeric or other suitable material as described in detail in the incorporated disclosure is disposed on the interior edge 13. The edge coating in FIG. 1 has a preferred shape but may take on any appropriate shape depending upon the dictates of a particular sealing application. The edge coating illustrated in FIG. 1 is wider in its central portion than at its edges and protrudes beyond the facial planes of the base sheet to form protruding rims 16. The material of the edge coating penetrates the porous edge 13 of the base sheet to form an intrusion zone 17, which anchors the edge coating, seals the edge pores, and densities the edge region of the gasket to concentrate clamping load in this region.

The coating material from which the edge coating 14 is formed preferably is a polymeric material that is formulated to exhibit a predetermined rheology and predetermined physical properties such as spring rate and resiliency as dictated by the intended application. The coating material is further formulated to exhibit a predetermined degree of surface adhesion such that, when clamped between flange surfaces, the edge coating will adhere or stick to the flange surfaces to provide an enhanced seal. The formulation of the coating material may be accomplished by selecting an appropriate polymer or by blending two or more polymers to obtain a homogeneous blend with the desired properties. When clamped between two flange surfaces, the edge coating conforms to roughness and deflection in the flange surfaces as described in detail in the incorporated disclosure. In addition, an adhesive bond forms between the edge coating and the flange surfaces to provide the benefits discussed above. Further, and significantly, the bonding of the edge coating to the flange surfaces renders the seal much more tolerant to shear forces resulting from relative movement of the flanges. This is because the edge coating tends to be pulled and stretched when subjected to such shear forces rather than being abraded by the flange surfaces.

Figure 2:
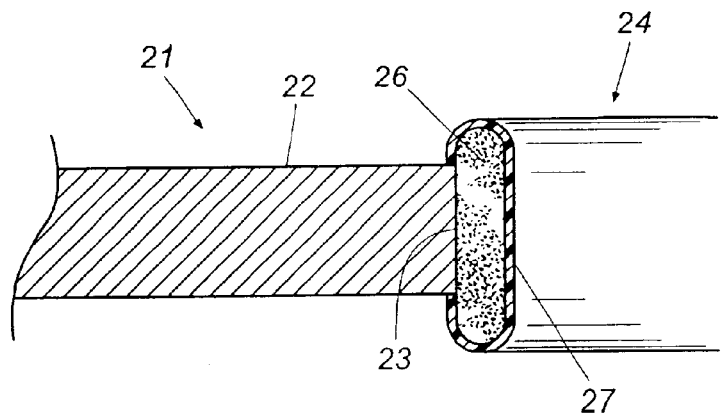
FIG. 2 is a cross-sectional illustration of a rubber edged gasket that embodies principles of the invention.

FIG. 2 illustrates the present invention applied to a molded rubber edge gasket, which is a type of controlled compression gasket. The gasket 21 comprises a non-compressible carrier 22, which may be made of hard plastic, metal, or other appropriate material. The carrier has in interior edge 23 that defines and aperture. A rubber seal 26 is molded onto or otherwise attached to the interior edge 23 surrounding the aperture of the gasket. An outer layer 27 of polymeric or other appropriate material is disposed on the rubber seal and forms the exposed surface of the resulting composite edge structure. The material from which the layer 27 is formed is selected or formulated to have a predetermined surface adhesion and the rubber seal, which forms the core of the composite edge structure, exhibits its usual physical properties.

When the gasket of FIG. 2 is clamped between a pair of flange surfaces, the composite edge seal is compressed to the thickness of the rigid carrier, which creates a limited stress between the edge structure and the flange surfaces as determined by the properties of the rubber core, just as with a traditional controlled compression gasket. However, since the outer layer 27, which has adhesive properties, is in direct contact with the flange surfaces and the rubber core is not, an adhesive bond is established between the edge structure and the flange surfaces. Accordingly, the desirable attributes of a controlled compression molded rubber edge gasket are preserved and the additional benefits of surface adhesion, which does not occur with a bare rubber edge, are provided. The result is an enhanced seal that is more stress relaxation failure resistant and more tolerant of sheer forces exerted by the flanges.

Figure 3:
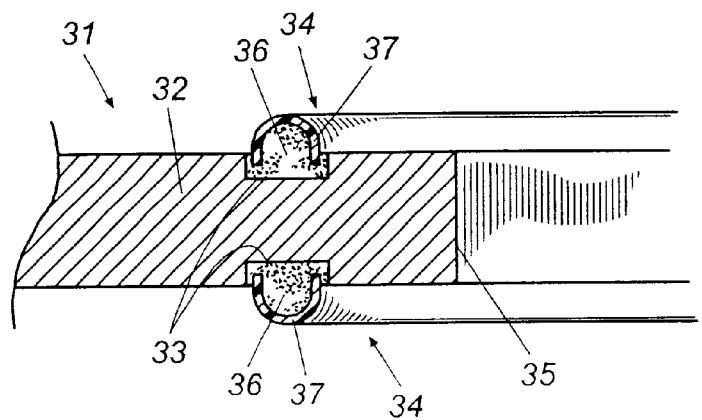
FIG. 3 is a cross-sectional illustration of a beaded controlled compression rubber gasket that embodies principles of the invention.

FIG. 3 illustrates another type of controlled compression rubber gasket that embodies principles of the invention. The gasket 31 comprises a non-compressible carrier 32, which may be made of hard plastic, metal, or other appropriate material. The carrier 32 has an interior edge 35 that bounds an aperture of the gasket. The carrier is formed with recesses 33 in its faces. Rubber beads 36 are disposed, preferably by an injection molding or other appropriate manufacturing process, in the recesses and each bead protrudes beyond the respective face of the carrier. A layer 37 of a selected preferably polymeric material is coated onto the rubber beads, forming a composite or layered bead structure. The material of the layer 37, which preferably is a polymeric material, is formulated to provide a predetermined surface adhesion with flange surfaces between which the gasket 31 is clamped.

When clamped between flange surfaces, the layered beads of the gasket 31 are compressed between the surfaces a predetermined amount as determined by the thickness of the carrier or the compression limiters. The rubber beads provide compression stress against the flange surfaces in the usual way to establish an initial interfacial seal. In addition, the material of the layer 37 establishes an adhesive bond with the surfaces, which provides the additional advantages and an enhanced seal as discussed above.

Figure 4:
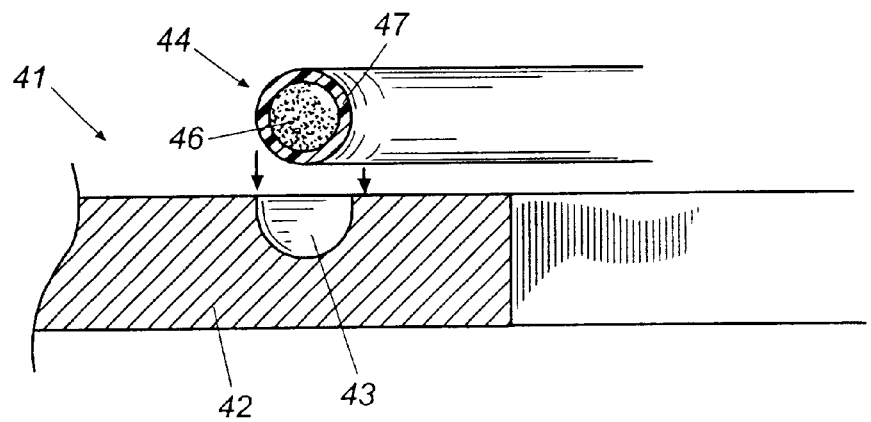
FIG. 4 is a cross-sectional illustration of a controlled compression rubber gasket in the form of a traditional O-ring that embodies principles of the invention.

FIG. 4 illustrates a controlled compression rubber gasket assembly in the form of a traditional O-ring that nestles within a groove in one of a pair of flange surfaces. The assembly 41 comprises a flange 42 having a flange surface formed with a groove or recess 43. A composite or layered O-ring is sized and configured to be received in the groove and the groove is profiled to insure that the O-ring is subjected to limited compression stress when the flange 42 is bolted to a mating flange (not shown). The composite O-ring is formed with a core of a rubber or other appropriate material selected for its mechanical properties in the usual way. A coating 47 of a polymeric or other appropriate material is disposed on the core 46 and is formulated to provide surface adhesion appropriate to the particular sealing application. When the two flanges are clamped together, an interfacial seal is established in the usual way by the rubber core through compressive stress between the O-ring structure and the surfaces of the flanges. The coating 47 adheres to and establishes an adhesive bond with the surfaces to provide an enhanced seal.

Figure 5:
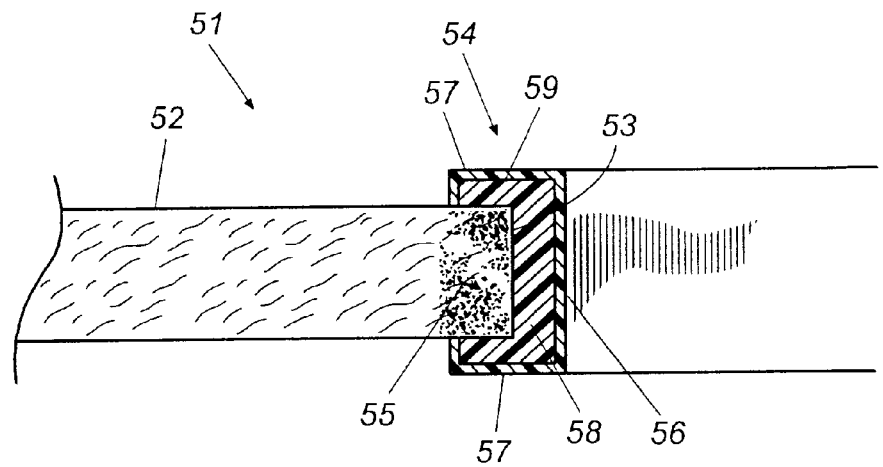
FIG. 5 is a cross-sectional illustration of a wrapped edge coated gasket that embodies principles of the invention.

FIG. 5 illustrates the invention applied to an edge coated compressible gasket, and particularly to a wrapped edge gasket with face coatings surrounding the aperture. The gasket 51 comprises a base sheet 52 of a compressible preferably fibrous gasket material having an interior edge 53 that bounds an aperture of the gasket. A wrapped edge coating 54 is disposed on the interior edge 53 as described in the incorporated disclosure and the material of the edge coating penetrates the porous edge to define an intrusion zone 55. The wrapped edge coating defines an edge coating portion 56 on the edge of the base sheet and the coating wraps partially onto the faces of the base sheet to define face coatings 57, which extend in relatively narrow strips around the aperture of the gasket. The wrapped edge coating is made up of a core 58 of a first polymeric material formulated to provide a rheology and mechanical properties appropriate for the specific application for which the gasket is intended. An outer layer 59 of a second polymeric material is coated onto the core 58, forming a composite or layered edge coating structure. The second polymeric material is formulated to provided a predetermined desired surface adhesion to form an adhesive bond with a pair of flange surfaces between which the gasket is clamped. The outer layer 59 is illustrated covering the entire surface of the core 58 in FIG. 5; however, it will be appreciated that the outer layer may cover only a portion, such as areas that engage the flange surfaces, of the core if desired and other configurations are possible as well.

The embodiment of FIG. 5 provides a solution in situations where a single polymer or homogeneous polymer blend with both the desired physical properties and the desired adhesive characteristics cannot easily be formulated. In this composite edge structure, the material of the core provides the desired physical properties and the material of the outer layer provides the required surface adhesion. It is not intended by showing a wrapped edge coating in FIG. 5 that the composite or layered edge coating structure is applicable only to wrapped edges. On the contrary, it may be applied to any or all of the configurations illustrated in the incorporated disclosure or to other configurations not illustrated therein.

Figure 6:
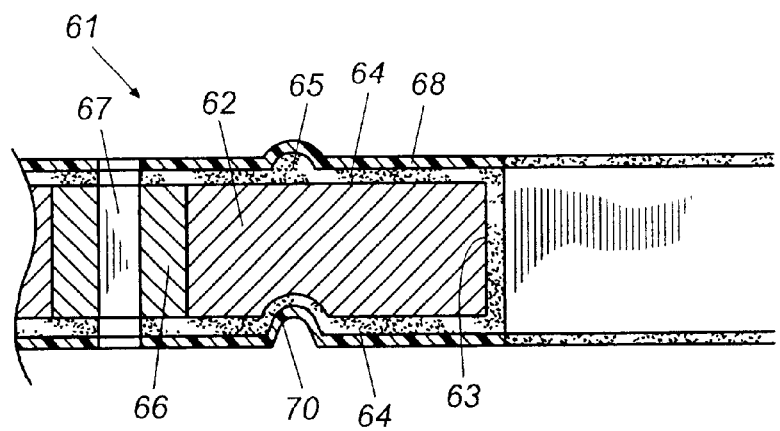
FIG. 6 is a cross-sectional illustration of a rubber coated metal gasket that embodies principles of the invention.

Finally, FIG. 6 illustrates a rubber coated metal gasket 61 that embodies principles of the invention. Here, a metal or other non-compressible core 62 has an interior edge 63 and is provided with a coating or cladding 64 of a rubber or other appropriate material. As is common, the gasket may be stamped or embossed to form a protruding element 65 and corresponding depression 70 if desired to concentrate compressive stress in critical areas of the gasket. An outer layer 68 of a polymeric or other appropriate material is disposed on and covers at least a portion of the rubber coating 64. In the illustrated embodiment, the polymer is only disposed in areas engaged by the flange surfaces and not on the interior edge of the gasket, although this is not a limitation of the invention. The outer layer of material is formulated to provide a desired surface adhesion to establish an adhesive bond with the flange surfaces when the gasket 61 is clamped therebetween. As with other embodiments, the rubber coating provides the traditional advantages of rubber coated metal gaskets and the outer layer provides the added advantages of surface adhesion not present in a traditional rubber coated metal gasket.

Test Results

Tests were conducted in an effort to characterize the release properties of and differences in surface adhesion between two selected polymeric materials that may be appropriate for use in this invention and a traditional rubber coated metal gasket. For these tests, known as perpendicular pull tests, three samples, A, B, and C, were tested with both steel and aluminum flange surfaces. Samples A and B each was a two-square-inch film of a polymeric edge coating material of the type typically used to form the edge coatings of edge coated gaskets such as those described in the attached application. Sample A was formed of a homogeneous copolymer blend material and sample B was formed of a single polymer. Sample C was a two-square-inch specimen of a traditional rubber coated metal gasket without embossments. Embossments were omitted to insure full surface contact between the test flanges and the rubber coating of the gasket material. In each case, the sample was clamped between flange surfaces with a predetermined clamping load as noted in the table below (load in pounds per square inch (psi)). The samples were each left clamped between the flanges for 22 hours at room temperature, after which the force required to pull the flanges apart was measured and noted. The following results are in pounds of pull in each case for Gaskets A–C.

TABLE 1

| LBS OF PULL TO SEPARATE FLANGES | | | | |
| --- | --- | --- | --- | --- |
| | STEEL | | ALUMINUM | |
| | Test 1 | Test 2 | Test 1 | Test 2 |
| CLAMP LOAD (psi) | 396 | 198 | 288 | 144 |
| GASKET A | 293 | 76 | 198 | 56 |
| GASKET B | 261 | 77 | 208 | 64 |
| GASKET C | 2.0 | — | 0.5 | — |

It can be concluded from these tests that the surface adhesion provided by the rubber material of a traditional rubber coated metal gasket is insignificant. On the other hand, the surface adhesion provided by the tested polymeric materials on both steel and aluminum flanges is very high by comparison. Such polymeric materials may be good candidates for the edge coatings and outer layers of the gaskets of the present invention.

The materials from which the controlled adhesion coatings of the present invention are formed may be selected from a wide range of possibilities depending upon the mechanical and physical properties and the surface adhesion properties required for a particular application. For instance, these materials, and particulary materials for providing physical or mechanical properties, may be selected from the group consisting of acrylic, acrylonitrile, acryloniotrile butadiene rubber, fluoro polymers, hydrogenated acrylonitrile butadiene rubber, styrene butadiene polymer, fluoroelastomer polymer, acrylic-acrylonitrile polymers, carboxylated acrylonitrile polymer, carboxylated styrene butadiene polymer, polyvinylidene chloride, chloroprene rubber polymer, ethylene propylene rubber polymer, ethylene/vinyl acetate polymer, epoxy, fluorosilicones, polyurethane, silicone rubber coatings, and copolymers, terpolymers, and mixtures thereof. Some materials with controllable adhesion properties and suitable for use as a coating or a component in a homogeneous blend according to the invention include tackifiers and pressure sensitive adhesives as well as polymers, co-polymers, and other materials with adhesive properties.

The invention has been described herein in terms of preferred embodiments. Many additions, deletions, and modifications may be made to the illustrated embodiments by those of skill in the art within the scope of the invention. For example, while traditional controlled compression rubber gaskets have been illustrated, a coating with surface adhesion properties might be applied to virtually any type of gasket where such adhesion would enhance the seal. Further, in the illustrated embodiments, only a core material and a single coating have been shown. Multiple layers or multiple core materials may also be used and all such configurations are within the scope of the invention. Finally, the forgoing discussion focuses on providing gaskets wherein the two independently tailored properties are mechanical characteristics and surface adhesion. However, the invention is not limited to tailoring only these two properties. The tailoring of multiple properties through appropriately formulating or blending edge coating material and/or through providing layered coatings on gaskets may also be applied to obtain other types of dual or multiple properties such as, for example, mechanical characteristics and resistance to the service fluid. Thus, the invention should not be considered to be limited only to gaskets wherein mechanical properties and surface tack are the tailored properties. Many other modifications and configurations may be made by those of skill in the art without departing from the spirit and scope of the invention as set forth in the claims.

What is claimed is:

1. A gasket for creating a seal between a pair of surfaces, said gasket comprising:

a non-compressible carrier as a base sheet having at least one edge forming a boundary of a gasket aperture with a polymeric core attached thereto and extending outwardly from said gasket aperture, an edge coating of pressure sensitive adhesive bonded to said polymeric core and forming an exposed convex inwardly facing surface and opposed laterally facing rims of said edge coating.

2. The gasket of claim 1, wherein said non-compressible carrier is formed of metal or plastic.

3. The gasket of claim 1, wherein said pressure sensitive adhesive includes a polymer selected from polyvinyl alcohol, polyurethane, polyacrylate, acrylonitrile butadiene rubber, styrene butadiene rubber, and ethylene vinyl acetate.

4. The gasket of claim 1, wherein said polymeric core is formed of compression molded rubber.

5. The gasket of claim 1, wherein said pressure sensitive adhesive is formed of a homogeneous blend of at least two polymers.

\* \* \* \* \*